United States Patent
Skiba et al.

(10) Patent No.: US 9,894,206 B2
(45) Date of Patent: Feb. 13, 2018

(54) ON-TOPIC MONITOR

(71) Applicant: AVAYA INC., Santa Clara, CA (US)

(72) Inventors: David Skiba, Golden, CO (US); George W. Erhart, Loveland, CO (US); Patrick Tendick, Basking Ridge, NJ (US); Wen-Hua Ju, Monmouth Junction, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/285,160

(22) Filed: Oct. 4, 2016

(65) Prior Publication Data

US 2018/0020095 A1 Jan. 18, 2018

Related U.S. Application Data

(60) Provisional application No. 62/363,501, filed on Jul. 18, 2016.

(51) Int. Cl.
*H04M 3/51* (2006.01)

(52) U.S. Cl.
CPC .... *H04M 3/5175* (2013.01); *H04M 2203/401* (2013.01); *H04M 2203/402* (2013.01)

(58) Field of Classification Search
None
See application file for complete search history.

(56) References Cited

U.S. PATENT DOCUMENTS

| 8,180,779 | B2 | 5/2012 | Horowitz et al. |
| 8,346,563 | B1* | 1/2013 | Hjelm ................ G10L 15/1822 |
| | | | 379/88.01 |
| 8,634,543 | B2 | 1/2014 | Flockhart et al. |
| 9,020,135 | B2 | 4/2015 | Skiba et al. |
| 9,100,480 | B2 | 8/2015 | Kohler et al. |
| 2003/0041029 | A1* | 2/2003 | Gould ................ G06Q 10/10 |
| | | | 705/50 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2013/0268260 | A1* | 10/2013 | Lundberg ............... G06F 17/28 |
| | | | 704/8 |

(Continued)

OTHER PUBLICATIONS

U.S. Appl. No. 15/285,091, filed Oct. 4, 2016, Skiba et al.

*Primary Examiner* — Harry S Hong

(74) *Attorney, Agent, or Firm* — Sheridan Ross P.C.

(57) ABSTRACT

Contact centers comprise agents, human and automated, interacting with customers over a network to accomplish an objective for the interaction. While a blunt, factual exchange may appear to be the most expeditious means to accomplish the objective, often this is not the case. Humans often respond better when the interaction comprises a mix of progress (e.g., portions of the interaction directed towards the objective) and banter (e.g., portions of the interaction not directed to the progress). Determining the mix may be provided by analyzing historic interactions and their success. A current interaction may be analyzed and when the mix is outside an acceptable range and an automated agent may be configured to alter the mix accordingly or, when the agent is a human, signal the agent to make the alteration. Success may be continually monitored and the target mix adjusted based on subsequent interactions.

20 Claims, 6 Drawing Sheets

(56) References Cited

U.S. PATENT DOCUMENTS

| | | |
|---|---|---|
| 2014/0081687 A1 | 3/2014 | Flockhart et al. |
| 2014/0244712 A1* | 8/2014 | Walters .................. H04L 67/10 709/202 |
| 2014/0304343 A1* | 10/2014 | Skiba .................. H04M 3/5175 709/206 |
| 2015/0139416 A1 | 5/2015 | Skiba et al. |
| 2015/0163358 A1 | 6/2015 | Klemm et al. |

* cited by examiner

ON-TOPIC MONITOR

CROSS-REFERENCE TO RELATED APPLICATIONS

The present application claims the benefit of Provisional Patent Application No. 62/363,501, filed on Jul. 18, 2016, and is incorporated herein by reference in its entirety.

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to communications systems and particularly to interaction systems monitoring a communication on the communication system.

BACKGROUND

Prior art text-based communication automation and agent interaction systems produce varying levels of quality. Automation-based systems can result in robotic, singular task focused interactions that are impersonal and even seem unfriendly. Agent-based interaction systems give the freedom of live human interaction but the agent can often stray from the topic and make slow or no progress towards the given goal of serving the customer. Banter is often a key factor in losing focus of the conversation.

SUMMARY

These and other needs are addressed by the various embodiments and configurations of the present invention.

The present invention can provide a number of advantages depending on the particular configuration.

These and other advantages will be apparent from the disclosure of the invention(s) contained herein.

In one embodiment, a system is disclosed, comprising: a communications monitor to monitor an interaction between a customer of a contact center and an agent of the contact center, the interaction utilizing a communications network; a data repository comprising entries, the entries further comprising at least one of banter content and progress content; a processor to match a portion of the interaction to the at least one of banter content and progress content; and wherein the processor further calculates an observed progress-to-banter ratio from, at least, the matched portion of the interaction to the at least one of banter content and progress content; and wherein the processor outputs a signal comprising indicia of the observed progress-to-banter ratio for reception by a signal-receiving component.

In another embodiment, a method is disclosed, comprising: monitoring an interaction utilizing a communications network, the interaction comprising communications of a customer of a contact center and an agent of the contact center; accessing, by a processor, a data repository comprising entries, the entries further comprising at least one of banter content and progress content; matching, by the processor, a portion of the interaction to the at least one of banter content and progress content; calculating, by the processor, an observed progress-to-banter ratio from, at least, the matched portion of the interaction to the at least one of banter content and progress content; and signaling, by the processor to a signal-receiving component, the signal comprising indicia of the observed progress-to-banter ratio.

In another embodiment, a system is disclosed, comprising: means for monitoring, by a communications monitor, an interaction between a customer of a contact center and an agent of the contact center, the interaction utilizing a communications network; means for maintaining entries in a data repository, the entries further comprising at least one of banter content and progress content; means for matching, by a processor, a portion of the interaction to the at least one of banter content and progress content; and means to calculate, by the processor, an observed progress-to-banter ratio from, at least, the matched portion of the interaction to the at least one of banter content and progress content; and means to signal, by the processor, an output device associated with the agent, wherein the signal comprises the observed progress-to-banter ratio.

In one embodiment, communication systems may facilitate a variety of communication interactions thereon, such as the systems of a contact center facilitating interactions between contact center agents (or, more simply, "agents") and customers. Interactions, both historical and real-time, may be monitored and ingested for analysis. Systems and methods are provided to model the types of successful dialogs, content, questions, domain words, and agent responses. A model may then be built comprising optimal dialog interactions, that is, without banter or off-topic content. A separate banter model may be tracked and built to cover all non-goal type interactions (e.g., banter or other off-topic content.).

In another embodiment, a run-time component is provided to monitor dialog interactions with a customer of the contact center. Two targets may be applied to the interaction: banter level and dialog pace. The banter level controls how much banter is injected into an automated interaction and/or how much banter is allowed to be provided, or accepted, by the live agent. If a threshold for either, or both, the banter level or dialog pace is crossed, the agent is notified to adjust the interaction or an automated agent is modified according to the adjustment. The dialog pace may be calculated as a running pace, based on a classified optimal dialog. The automation component attempts to keep the dialog progressing towards resolution and, if outside of threshold, automatically applies alterations to bring the interaction back in line or, if unsuccessful, transfer to assisted/live agent. When in live-agent mode, dialog pace may be measured to ensure an agent is making acceptable progress toward the dialog end state. Even if an agent is not over the banter threshold, they may be making insufficient progress in the dialog and need to be adjusted or have a supervisor notified.

In other embodiments, additional and/or alternative embodiments may build the optimal dialog model utilizing one or more of: question density, phrase length, response speed, agent adapted model, etc.

The term "historic," as used herein, refers to a prior occurrence in time without regard to the identity of the particular participants. For example, a current or future interaction may benefit from data derived from a historic interaction, as described herein. The historic interaction having been an interaction between a historic agent and a historic customer. The current agent and the current customer of current interaction may comprise none, one, or both of the historic agent and historic customer without departing from the scope of embodiments disclosed herein.

The term "interaction" refers to a communication between at least one customer of a contact center and at least one agent over an electromagnetic, electromechanical, and/or optical communications network which may include one or more of the internet, public switched telephone network, private switched telephone network, radio/microwave-frequency networks (e.g., cellular telephone, Wi-Fi, WiMAX, Bluetooth, satellite, etc.), optic networks (e.g., fiber optic, broadcast infrared, etc.), and/or other networks operable to facilitate an interaction. In one embodiment, the interaction may comprise of one or more real-time interactions, such as via a voice call or video chat and serial exchanges (e.g., text-chat, SMS, social media messages, emails, etc.), without departing from the scope of embodiments disclosed herein. The interaction having an associated objective by one or more of the contact center and the customer which motivated the interaction and includes, but is not limited to, making a purchase/sale, gathering/providing/modifying information, performing/obtaining a service, etc.

The term "progress," as used herein, refers to a portion of an interaction addressing the objective of the interaction. The objective may be known before the interaction begins, such as when a customer selects a particular option in an interactive voice response (IVR) system, or unknown and discovered during the interaction. The objective may be, or become, a plurality of objectives and/or change. For example, a customer may call an agent to inquire about their checking account balance. The objective may change if it is discovered that the checking account has had unauthorized activity.

The term "banter," as used herein refers to portions of an interaction that are not "progress" (see above). Optionally, banter may include silence, playback of a recorded message, and/or other non-interaction portions of a communication between a customer and the contact center. In one embodiment, banter comprises topics not associated with a domain of the objective, such as social interactions, expressions of friendliness, expression of empathy, etc. For example, discussions of the weather may be banter for a banking interaction which, absent an impact affecting bank closures or data accessibility, is independent of the weather. However, weather may not be banter for a tourism interaction which may have weather-specific impact to an objective of the interaction. In another example, discussion of family may be banter for an interaction troubleshooting an internet connectivity issue, as family interests will not determine internet connectivity. In contrast, family activities may be relevant to the objective of a life insurance interaction. In another embodiment, banter and progress may be present in the same topic. For example, the discussion of the weather for an interaction regarding automobile tires may be both banter and progress, as weather is both a social topic of conversation and a potential impact on the objective of selecting tires.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
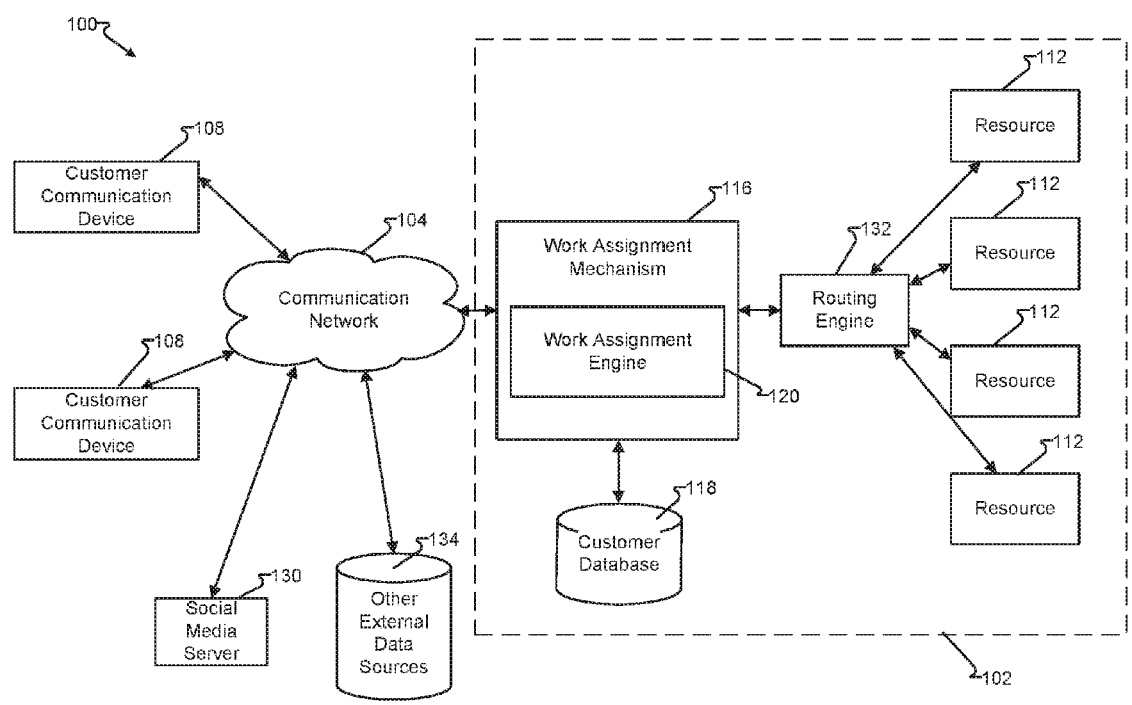
FIG. 1 depicts a communication system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are, or are associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., Wi-Fi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media, and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
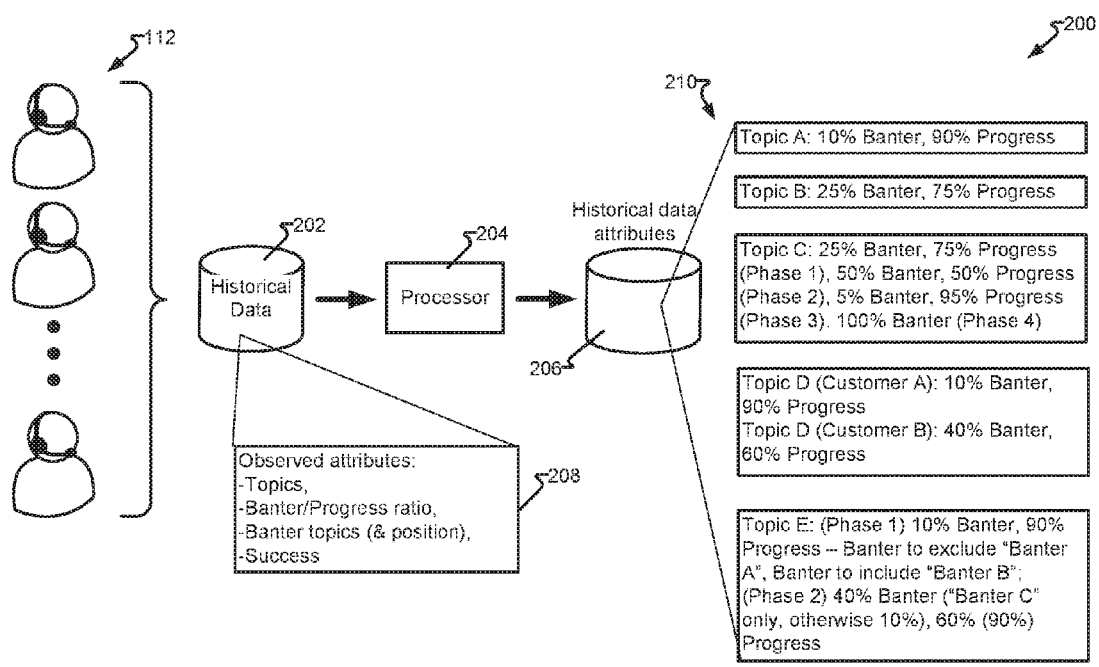
FIG. 2 depicts a data analysis system in accordance with embodiments of the present disclosure.

FIG. 2 depicts data analysis system 200 in accordance with embodiments of the present disclosure. As an overview, and in one embodiment, a number of interactions with historic agents (resources 112) are maintained in historical data 202. Historical data 202 may comprise analyzed attributes of historic interactions, such as one or more of topics, progress-to-banter ratio, banter topics, position of a particular banter within a plurality of progress portions of the historic interaction, and success of the historic interaction. In another embodiment, historic data 202 may comprise unanalyzed recordings of historic interactions (e.g., audio files, video files, transcripts, speech-to-text transcriptions, images, etc.). The unanalyzed recordings may be analyzed by a processor, such as processor 204, as needed or upon the occurrence of a triggering event.

In another embodiment processor 204 analyzes historical data 202 to determine historical data attributes 206. Historical data attributes 206 may comprise one or more entries 210. Entries 210 may be associated with an entire interaction, portion of an interaction, overall topic, subtopic, etc. Entries 210 may indicate a ratio of banter-to-progress, progress-to-banter, and/or mathematical equivalence. Entries 210 may also comprise time and/or positional information, such as a particular banter should, or should not be, utilized in the first 30 seconds of the interaction and/or should, or should not be, before or after a particular portion of progress.

Historical data attributes 206 may in another embodiment, provide an ideal model comprising only progress portions of historical interactions from historical data 202 and a banter model comprising non-progress portions of historical interactions from the historical data 202. The ideal model may then be provided to a future current agent 112 is a prompt or script in order to maintain progress towards an objective. Additionally, and another embodiment, a banter model is provided to the agent based upon success of the historical data 202, for insertion by a current or future agent 112. In a further embodiment specific banter and/or specific timing of banter is provided to the future or current agent 112. As a benefit of segregating banter from progress, progress may be maintained as a constant in future interactions while the amount and/or timing of a banter selectively modified, such as in response to updated success information from subsequent historical interactions provided to historical data 202.

Figure 3:
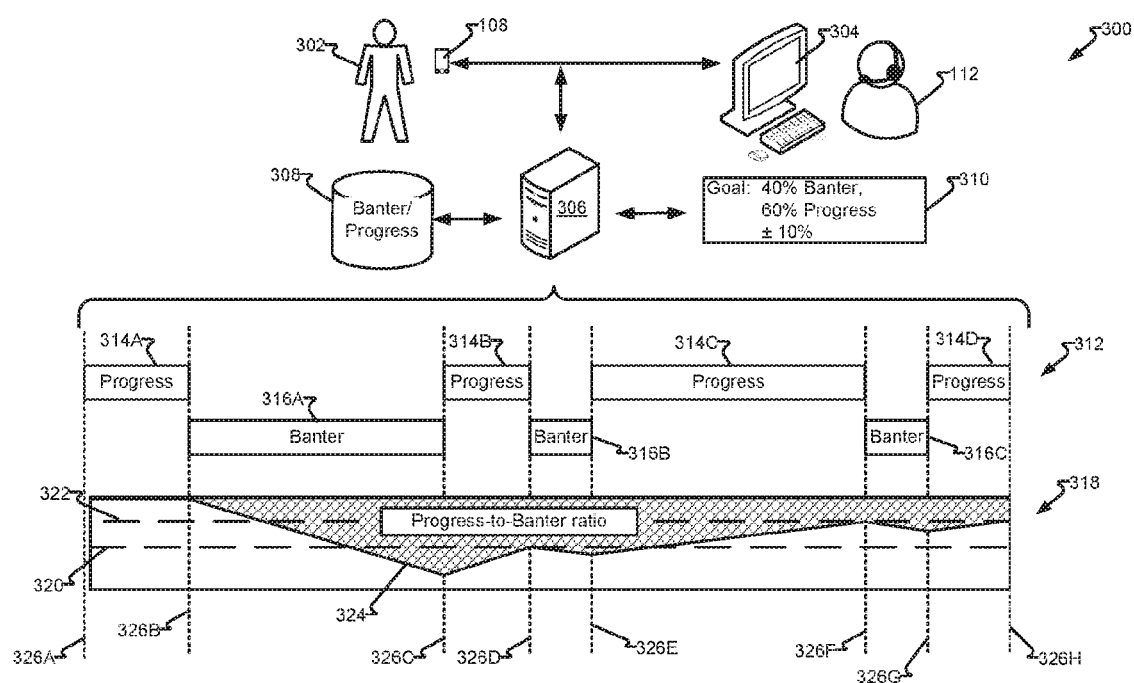
FIG. 3 depicts a communications monitoring system in accordance with embodiments of the present disclosure.

FIG. 3 depicts communications monitoring system 300 in accordance with embodiments of the present disclosure. In one embodiment, customer 302 utilizing customer communication device 108 is engaged in an interaction with agent 112 utilizing agent communication device 304. Server 306 monitors the interaction between customer 302 and agent 112. Server 306 may access banter/progress database 308 comprising records of at least one of banter and progress content. In one embodiment, banter/progress database 308 comprises only banter content and any lacking of the match by server 306 to a portion of the interaction between customer 302 and agent 112 of an entry within banter/progress database 308 would be considered progress. Conversely, and in another embodiment, banter/progress database 308 comprises only progress content and any lacking of the match by server 308 of an entry within banter/progress database 308 to a portion of the interaction between customer 302 and agent 112 would be considered banter. In another embodiment, banter/progress database 308 comprises both banter content and progress content. Any lack of matching by server 308 to an entry within banter/progress database 308 may be discarded as unmatched or subject to a default rule, such as an assumption of banter or progress which may further be weighted to reflect a lesser degree of certainty as compared to a matched entry.

In another embodiment, server 306 may access target progress-to-banter ratio 310, such as derived from historical data attributes 206, which may comprise one or both of a target banter and target progress. Target progress-to-banter ratio 310 may further comprise a target range for the ratio of progress-to-banter ratio. It should be appreciated by those of ordinary skill in the art that certain mathematical equivalence may be provided without departing from the scope of the embodiments disclose. For example, a target banter amount of 25% is equivalent to a target progress amount of 75%, when the entire interaction portion is considered to be either banter or progress. When an interaction portion cannot be determined as banter or progress, the amount of banter and/or progress may be considered for the interaction less the portion that cannot be determined. The composition of an interaction, or interaction portion, may be represented as a ratio of banter to progress, or vice versa, a time value (e.g., thirty seconds of banter every three minutes), events (e.g., one item of banter for every three items of progress), ordered or unordered specific banter (e.g., the weather, plans for an upcoming holiday, etc.).

During an interaction, agent 112, when embodied as a human, may utilize their judgement as to when to insert banter or specific banter. However, such freedom may cause agent 112 to insert too much banter, and sacrifice call center efficiency, or too little banter, and present an image of being cold, impersonal, or machine-like. In one embodiment, agent 112 is provided with indicia of an observed progress-to-banter ratio on agent communication device 304. The indicia may be for an entire interaction or ongoing. The observed progress-to-banter ratio may be graphical, textual, and/or audible (e.g., whisper channel tone or message). The presentation may be selectively provided, such as to indicate when agent 112 is outside of an acceptable threshold or provided throughout the interaction.

In another embodiment, the interaction between customer 302 and agent 112 comprises timeline 312, further comprising a number of interactions portions, further comprising one or more of progress portions 314 and banter portions 316 delineated by boundaries 326. Boundaries 326 may include, the beginning of the interaction boundary 326A, the end of the interaction 326H, and/or a number of banter-progress boundaries 326B-326G. Interaction portions may be defined by a portion of the interaction dedicated to only one of banter or progress, substantially only one of banter or progress (e.g., a majority of only one of banter or progress and a de minimis portion of the other of banter or progress), a fixed time delineation with an associated allocation indication (e.g., the interaction portion delineated by the one minute mark and ending at the two minute mark comprised 25% banter and 75% progress), event delineation (e.g., the interaction portion from the time the customer gave their account number until the time the transaction was authorized comprised 10% banter, 80% progress, and 10% undetermined), population sampling (e.g., out of the two hundred voice interactions currently ongoing in the contact center, 15% are currently engaged in banter), and/or other delineation. In another embodiment, an interaction portion is the entirety of the interaction.

In another embodiment, graph 318 illustrates progress-to-banter ratio 324 over time. Progress-to-banter ratio 324 from the start of the interaction 326A to delineation 326B is comprised entirely of progress portion 314, accordingly, progress-to-banter ratio 324 indicates the interaction is entirely progress. As the interaction progresses beyond delineation 326B, and incorporates banter portion 360 a progress-to-banter ratio 324 declines to delineation 326C. In another embodiment, progress-to-banter ratio 324 falls below maximum target banter line 320 (or minimum target progress line 320). Server 306 may present a signal to cause agent communication device to present graph 318 and/or an alert associated with progress-to-banter ratio 324 falling below maximum target banter line 320. Similarly, progress-to-banter line 324 may be above minimum target banter line 322 (or maximum target progress line 322), such as the portion of the interaction between delineation 326A and 326B, and may similarly cause server 306 to send a signal, comprising an indicia of the difference to agent communication device 304 accordingly. The indicia may be ongoing (e.g., a real-time display of graph 318, dial, bar graph, etc.); an out-of-target indicator, graph comprising progress-to-banter line 324 and target progress-to-banter line, such as an icon, light, tone, text-to-speech, or text message; indicia of the difference (e.g., "more banter," "a little more banter," "5% more banter," "no more banter," etc.).

In another embodiment, agent 112 may comprise an automated agent. While automated agents are generally more successful with text-based interactions, speech and video (e.g., avatar, humanoid, etc.) interactions are also contemplated by the disclosure herein. The automated agent 112 may be able to selectively insert banter into an interaction. While the automated agent 112 is engaged primarily in accomplishing the objective of the interaction, server 306 may signal the automated agent to insert more or less banter into the interaction. Accordingly, automated agent 112 may selectively include banter according to the signal.

Figure 4:
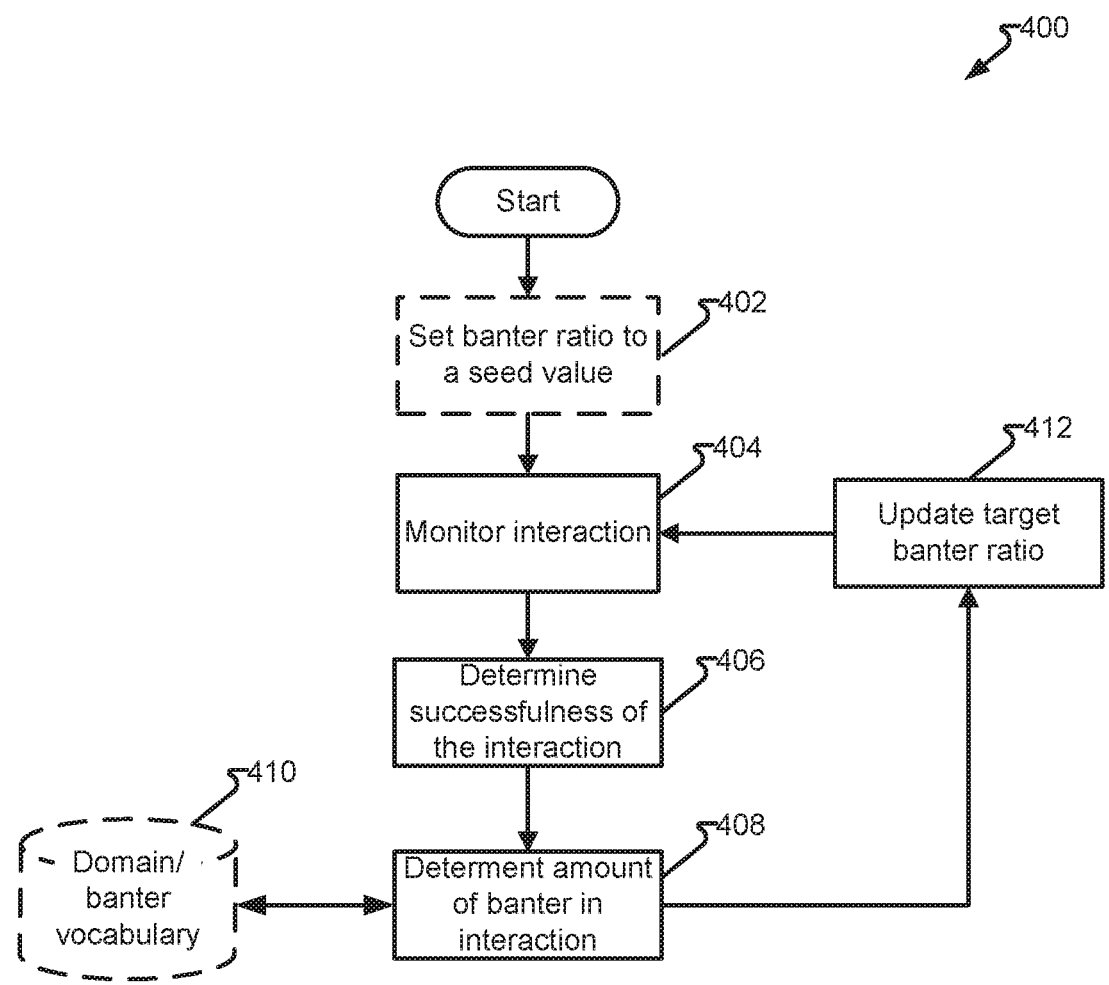
FIG. 4 depicts a first process in accordance with embodiments of the present disclosure.

FIG. 4 depicts process 400 in accordance with embodiments of the present disclosure. In one embodiment process 400 begins at optional step 402 where target progress-to-banter ratio is set to a seed value, for example, an industry-standard, preference of a client, estimation, etc. Step 404 monitors and interaction between agent 112 and one or more customers 302. Step 406 determines successfulness of the interaction. For example, if the interaction had a single purpose was it achieved, if the interaction had a plurality of purposes was at least one achieved, to the interaction not succeed but increased the likelihood of a future success, etc. Next, step 408 determines the amount of banter in the interaction. Step 408 may be performed by server 306 accessing domain/banter vocabulary 410 to match interaction portions (e.g., banter portions 316 and/or progress portions 314) to content provided in the interaction. Step 412 then updates the target progress-to-banter ratio accordingly. Domain/banter vocabulary 410 may comprise domain-specific content such that domain portions and/or banter portions of the interaction are identified correctly with respect to a particular domain of the interaction.

In another embodiment, the lack of success determined in step 406 may be utilized to determine a progress-to-banter ratio to avoid. Step 412 may apply a weight to the determined progress-to-banter ratio 408. For example, if step 404 monitors ten interactions, and step 406 determines three of the interactions are successful and step 408 determines the amount of banter is 50%, step 412 may update the target progress-to-banter ratio to indicate 50% banter is less likely to be successful. If another group of monitored interactions indicates 40% banter results in eight out of ten interactions being successful, step 412 may update the target progress-to-banter ratio to indicate 40% banter with a 5% variation. However, if 60% banter results in only one successful interaction, a "do not exceed" indicia may be signaled to ensure agent 112 has flexibility to provide a range of banter, but strongly dissuade 60% banter.

One or more of steps 402, 404, 406, 408, 412 may be performed by processor 204 and/or server 306. In another embodiment, processor 204 is integrated into server 306. In yet another embodiment, one or both of processor 204 and server 306 is provided by agent communication device 304, work assignment engine 116, work management engine 120, routing engine 132, and/or other component. Additionally, processor 204 and/or server 306 may comprise a single computing device, a plurality of computing devices, and/or a distributed computing device (e.g., internet or "cloud" processing service).

Figure 5:
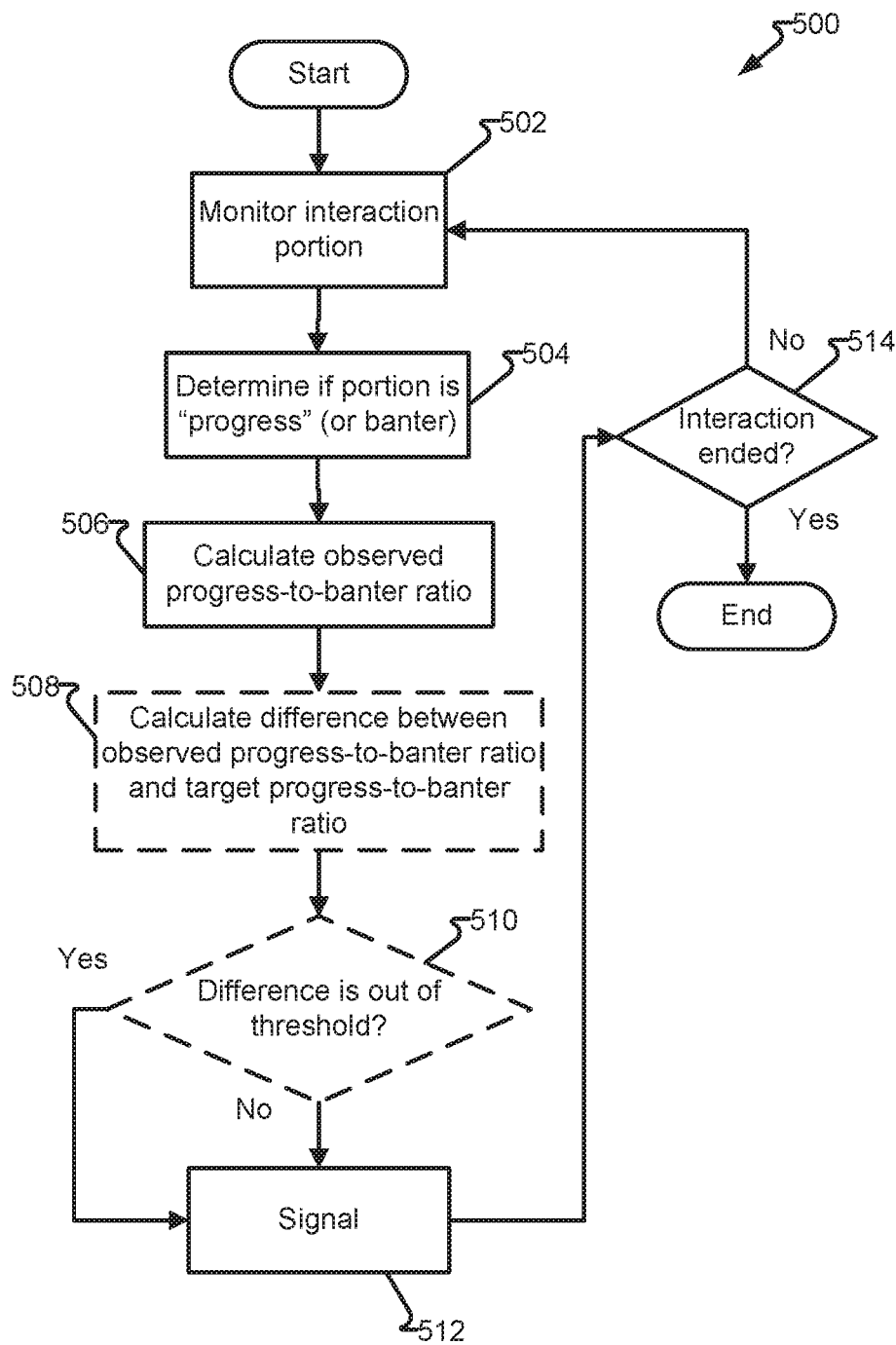
FIG. 5 depicts a second process in accordance with embodiments of the present disclosure.

FIG. 5 depicts process 500 in accordance with embodiments of the present disclosure. In one embodiment process 500 begins with step 502 monitoring and interaction portion. Step 504 determines if the portion is progress, banter, or if both the proportion of each. Step 506 calculates an observed progress-to-banter ratio and optionally step 508 calculates the difference between an observed progress-to-banter ratio and a target progress-to-banter ratio. Optional step 508 may follow optional step 510 wherein a determination is made if the difference determined in step 508 is outside of a previously established threshold. If yes, processing continues to step 512 where the signal is sent to a signal receiving component indicating the difference. If step 510 determines the difference is not out of threshold, signal step 512 may be omitted or provided without an indication that the difference is outside of a threshold value or range of values. If steps 508 and 512 are not performed, step 506 may directly precede step 512, wherein the signal is provided indicating the observed progress-to-banter ratio. Processing continues to step 514, wherein a determination is made whether the interaction is ended, and if yes, process 500 may terminate, otherwise step 514 may return to step 502.

In another embodiment, signal 512 may indicate domain-specific banter to include, not include, and, if included, optional timing. For example, an interaction wherein the customer is seeking a loan to buy a recreational fishing boat may warrant significant banter throughout the interaction in an effort to encourage positive feelings the customer may have regarding a new boat. In contrast, an interaction wherein the customer is seeking a loan to pay for an unexpected medical expense, may be nearly all progress, as the customer is unlikely wanting to discuss the details of such an unfortunate event. However, concluding the interaction with a brief, and appropriate, banter, may provide the customer with a more empathetic experience with the agent and associated business of the contact center.

In one embodiment, signal 514 is sent from processor 204 and/or server 306 to a signal-receiving component. The signal may comprise indicia of the observed progress-to-banter ratio, determined in step 506, difference determined in step 508, steps for agent 112 to perform to reduce the difference, target progress-to-banter ratio, and/or other indicia which may be processed by agent communication device 304, an agent communication device associated with a supervisor, and/or other additional processing or data storage component or components. The indicia signal 512 may be variously embodied and include a "ping," wherein agent communication device 304 presents an indicator of a deviation from a target progress-to-banter ratio when the "ping" is present, and omits presentation when the "ping" is absent. The signal may comprise computer-readable information for presentation by a device (e.g., agent communication device 304, data storage, and/or other device). The indicia may then be converted to display on an output device (e.g., earpiece, speaker, display, etc.) to present the indicia, which may include, but is not limited to, one or more of too much/little banter/progress, an amount to increase/decrease banter to meet a target progress-to-banter ratio, amount of banter to include to have the entire interaction meet a target progress-to-banter ratio, specific banter to add, specific time to add banter, specific banter to avoid, etc.

One or more of steps 502, 504, 506, 508, 510, 512, 514 may be performed by processor 204 and/or server 306. In another embodiment, processor 204 is integrated into server 306. In yet another embodiment, one or both of processor 204 and server 306 is provided by agent communication device 304, work assignment engine 116, work management engine 120, routing engine 132, and/or other component. Additionally, processor 204 and/or server 306 may comprise a single computing device, a plurality of computing devices, and/or a distributed computing device (e.g., internet or "cloud" processing service).

Figure 6A:
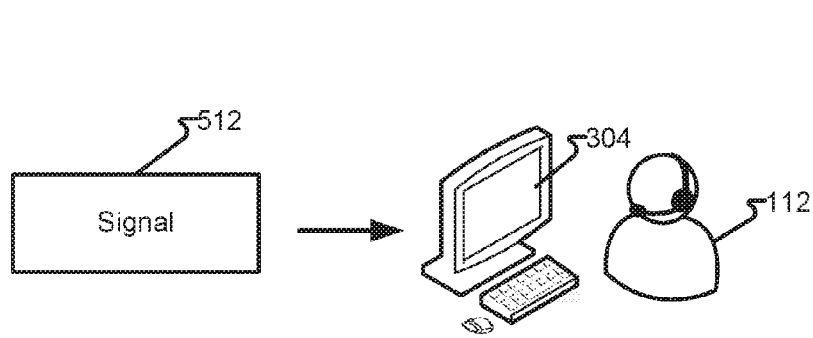
FIGS. 6A-6C depict signal-receiving systems in accordance with embodiments of the present disclosure.
Figure 6B:
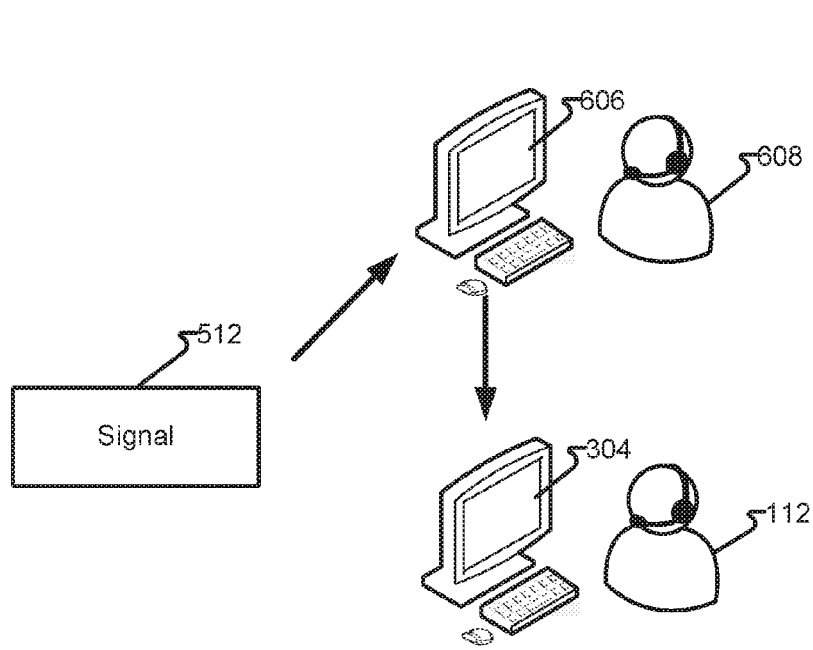
Figure 6C:
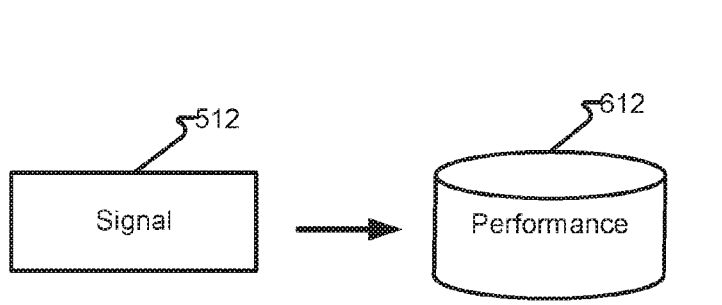

FIGS. 6A-6C depict signal receiving systems 602, 604, and 610, respectively and in accordance with embodiments of the present disclosure. System 602 illustrates signal 512 being presented to signal receiving device, embodied as agent communication device 304 for presentation to agent 112. Signal 512 may comprise indicia of an out of threshold condition, such as to be presented as an alert on each communication device 304, whisper notification, or other notification operable to alert agent 112 of the out of threshold condition. In another embodiment, signal 512 may comprise an ongoing progress-to-banter ratio for presentation by agent communication device 304. It should be appreciated that while real time presentation of signal 512 may allow for corrective action, historical processing may also be provided such as to allow agent 112 and/or other personnel to see how a particular agent or agents performed during one or more prior interactions.

System 604 illustrates one embodiment where signal 512 is sent to signal receiving device 606 embodied as a supervisor agent communication device operable to present indicia of the signal to supervisor 608. Supervisor 608 may then interact with agent communication device 304 and/or agent 112, such as to observe the interaction, provide suggestions to agent 112 via agent communication device 304 and/or whisper channel, physically observe agent 112, and/or join the interaction.

System 610 illustrates another embodiment whereby signal 512 is provided to performance database 612. Database 612 may be a repository for data utilized in agent and/or contact center metric calculations, payroll/bonus determination, and/or other repository of data, whereby the signal, having indicia of a current progress-to-banter ratio, out of threshold indication, etc., may be maintained.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA).

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems of a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, agent communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch, such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example, in one alternative embodiment, a supervisor reporting device is provided wherein an interaction comprising a subordinate of the supervisor is monitored and indicia provided on the supervisor reporting device, such as when an interaction is outside of an acceptable progress-to-banter threshold.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a communications monitor to monitor an interaction between a customer of a contact center and an agent of the contact center, the interaction utilizing a customer communication device, an agent communication device, and a communications network therebetween;
a database comprising entries, the entries further comprising at least one of banter content and progress content;
a computer processor to match a portion of the interaction to the at least one of banter content and progress content; and
wherein the computer processor further calculates an observed progress-to-banter ratio from, at least, the matched portion of the interaction to the at least one of banter content and progress content; and
wherein the computer processor outputs a signal comprising indicia of the observed progress-to-banter ratio for reception by a signal-receiving component.

2. The system of claim 1, further comprising:
the computer processor to further perform the match and calculation in substantially real-time; and
wherein the signal further comprises a real-time indicia of the observed progress-to-ratio banter.

3. The system of claim 1, wherein the signal-receiving component comprises an output device associated with the agent, the output device operable to present indicia of the observed progress-to-banter ratio to the agent.

4. The system of claim 1, wherein the database, further comprises, domain-specific entries, and wherein the progress content further comprises progress content specific to a domain.

5. The system of claim 1, further comprising:
the computer processor to access a target progress-to-banter ratio; and
wherein the computer processor outputs the signal comprising indicia of the target progress-to-banter ratio.

6. The system of claim 5, wherein the agent comprises an automated agent operable to selectively insert banter into the interaction and in response to a difference between the target progress-to-banter ratio and the observed progress-to-banter radio, then modifies the selective insertion of banter into the interaction to reduce the difference.

7. The system of claim 1, further comprising:
the computer processor further determines whether the interaction achieved a desired result associated with the interaction; and
the computer processor further updates a target progress-to-banter ratio in accord with the observed progress-to-banter ratio and whether the interaction achieved the desired result.

8. The system of claim 1, wherein:
the computer processor further determines whether the interaction achieved a desired result associated with the interaction; and
the computer processor further determines a new banter content from the interaction and updating the database to include an entry associated with the new banter content and indicia of the determination of whether the interaction achieved the desired result.

9. The system of claim 8, further comprising, the computer processor updating at least one entry in the database to indicate a position within the interaction in which the new banter content occurred.

10. The system of claim 1, further comprising:
wherein at least one banter content comprises an acceptability within a position of a plurality of positions within the interaction; and
the computer processor outputs the signal further comprising the acceptability with the position of the plurality of positions within the interaction.

11. A method, comprising:
monitoring an interaction utilizing a communications network, the interaction comprising communications of a customer of a contact center, utilizing a customer communication device, and an agent of the contact center, utilizing agent communication device, and;
accessing, by a computer processor, a database comprising entries, the entries further comprising at least one of banter content and progress content;
matching, by the computer processor, a portion of the interaction to the at least one of banter content and progress content;
calculating, by the computer processor, an observed progress-to-banter ratio from, at least, the matched portion of the interaction to the at least one of banter content and progress content; and signaling, by the computer processor to a signal-receiving component, the signal comprising indicia of the observed progress-to-banter ratio.

12. The method of claim 11, wherein the signal-receiving component comprises an output device associated with the agent, the output device operable to present indicia of the observed progress-to-banter ratio to the agent.

13. The method of claim 11, wherein the database, further comprises, domain-specific entries, and wherein the progress content further comprises progress content specific to a domain.

14. The method of claim 11, further comprising:
accessing, by the computer processor, a target progress-to-banter ratio; and
wherein the outputting of the signal by the computer processor, further comprises outputting the signal comprising indicia of the target progress-to-banter ratio.

15. The method of claim 11, further comprising:
accessing, by the computer processor, at least one historic interaction between a historic customer of the contact center and a historic agent of the contact center;
determining, by the computer processor, a historic progress-to-banter ratio and a success of the interaction to accomplish an objective of the historic interaction; and
upon determining the success of the interaction, causing, by the computer processor, the database, to have at least one of the entries comprising the historic progress-to-banter ratio.

16. The method of claim 15, wherein:
the step of calculating further comprises, calculating a difference between the historic progress-to-banter ratio and an observed progress-to-banter ratio; and
the signaling further comprises, providing indicia of the difference.

17. A system, comprising:
means for monitoring an interaction between a customer of a contact center and an agent of the contact center;
means for maintaining entries further comprising at least one of banter content and progress content;
means for matching a portion of the interaction to the at least one of banter content and progress content; and
means to calculate an observed progress-to-banter ratio from, at least, the matched portion of the interaction to the at least one of banter content and progress content; and
means to signal, an output device associated with the agent, wherein the signal comprises the observed progress-to-banter ratio.

18. The system of claim 17, further comprising:
means to access a target progress-to-banter ratio, and
wherein the signal further comprises indicia of a difference between the observed progress-to-banter ratio and the target progress-to-banter ratio.

19. The system of claim 18, further comprising:
means to observe a historic interaction between a historic customer of the contact center and a historic agent of the contact center;
means to determine a success of an objective of the historic interaction and a historic progress-to-banter ratio; and
upon determining the success of the objective, means to update the target progress-to-banter ratio with the historic progress-to-banter ratio.

20. The system of claim 17, further comprising:
means to observe a historic interaction between a historic customer of the contact center and a historic agent of the contact center;
means to determine a success of an objective of the historic interaction and a historic progress-to-banter ratio; and
upon determining the success of the objective, means to determine a historic banter of the historic interaction, and means to update at least one entry associated with the historic banter.

* * * * *